J. L. G. DYKES.
RUBBER TIRE ARTICLE.
APPLICATION FILED APR. 24, 1916.
1,210,155. Patented Dec. 26, 1916.
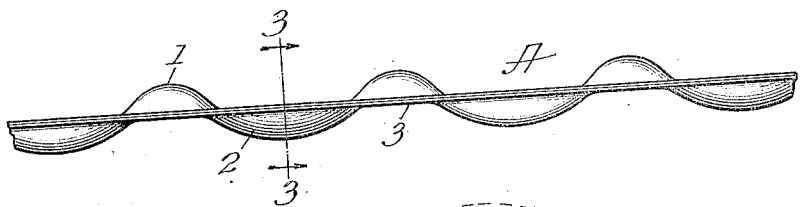
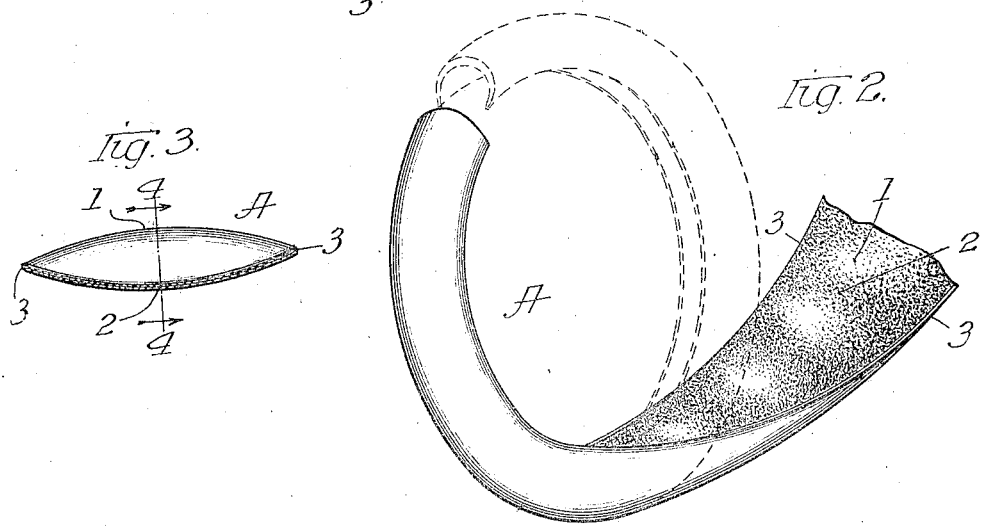
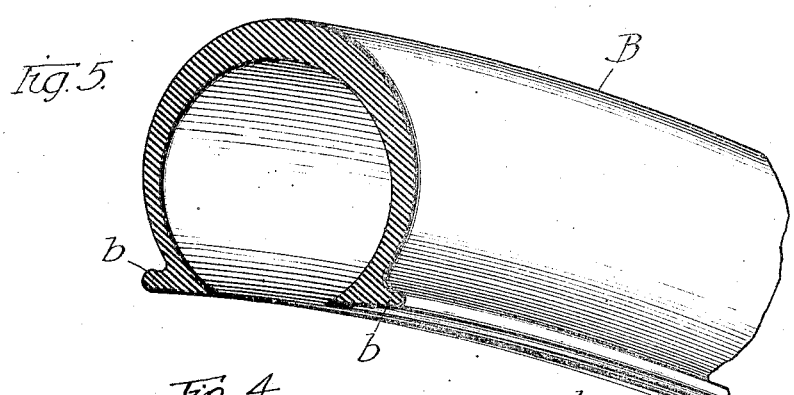
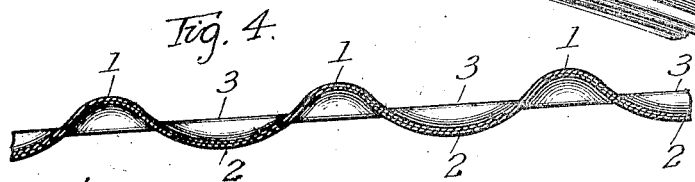
Inventor:
John L. G. Dykes
By Arthur F. Durand
Atty

UNITED STATES PATENT OFFICE.

JOHN L. G. DYKES, OF CHICAGO, ILLINOIS.

RUBBER-TIRE ARTICLE.

1,210,155. Specification of Letters Patent. Patented Dec. 26, 1916.

Original application filed January 29, 1914, Serial No. 815,174. Divided and this application filed April 24, 1916. Serial No. 93,090.

*To all whom it may concern:*

Be it known that I, JOHN L. G. DYKES, a citizen of the United States of America, and resident of Chicago, Cook county, Illinois, have invented a certain new and useful Improvement in Rubber-Tire Articles, of which the following is a specification.

My invention relates to rubber tire articles, such as pneumatic tires, outer casings and reliners, all of which have heretofore been made in such manner that they have the necessary curved formation practically as soon as finished, so that the rubber and fabric are in the condition or shape which is necessary for use, or practically so, thus requiring the manufacture of these articles on curved or annular mandrels, and in curved or annular molds, in a manner which is well known and understood.

Generally stated, the object of my invention is to provide a form of rubber tire article which, in its normal or finished condition, and before application to the wheel, is practically a flat strip of rubber and fabric, being under no tension when extended flatwise along a level surface, but having provisions whereby certain portions thereof may be pressed outward to, in effect, lengthen the middle portion of the strip, but not the side edges thereof, thus causing it to assume not only the circumferential curvature of the wheel, but also the cross-sectional curvature necessary for the tire or reliner, or other similar article, or practically so, and thus causing certain portions of the rubber to be self-retained in distorted condition, so that these portions are under tension which gives them a constant tendency to return of their own accord to normal condition.

The rubber tires or reliners or casings, or other rubber-tire-articles, constructed in accordance with my invention can, it will be seen, be shipped in a practically flat condition, without being distorted or held under tension, for the reason that the practically flat or spread-out condition is a natural or normal one.

To this and other useful ends, my invention consists in matters hereinafter set forth and claimed.

In the accompanying drawings:—Figure 1 is a side elevation or edge view of a reliner constructed in accordance with my invention, showing the same in its normal or practically flat condition. Fig. 2 is a view illustrating the transformation of the said reliner into the annular form which it has in use on the wheel, a portion of the flat strip being shown reduced to annular form in full lines, and the remaining portion, of which a part is shown broken away for convenience of illustration, being shown in its normal condition in full lines, but the completed transformation of the reliner being shown in dotted lines. Fig. 3 is a cross-section on line 3—3 in Fig. 1. Fig. 4 is a longitudinal section of the reliner on line 4—4 in Fig. 3. Fig. 5 shows a section of a pneumatic tire casing embodying the principles of my invention, the same being shown in the condition necessary for use on the wheel—that is to say, the casing being shown as having the circumferential and cross-sectional curvature which results from the distortion of certain portions along the tread of the casing, in the same manner that the reliner of Fig. 1 is transformed into an annular article in the manner shown in Fig. 2.

As thus illustrated, my invention comprises, for example, a reliner A composed of alternate layers of rubber and fabric, formed by superimposing a layer of rubber on a layer of fabric, then another layer of rubber, then another layer of fabric, and so on, until the required thickness is obtained. By any suitable method, transverse corrugations are formed in the strip of sheet material thus made from rubber and fabric. These corrugations 1 and 2 do not extend the full width of the strip of sheet material, but are reduced in depth or height, gradually, until they practically disappear at the side edges 3 of the strip. In other words, each corrugation is curved or rounded transversely of the strip, so that the side edges of the strip are perfectly straight and disposed in a common horizontal plane, when the strip is stretched out straight, as shown in Fig. 1. Thus, the depressions on the inner side of the reliner form the elevations on the outer surface thereof, and vice versa, so that each surface is characterized by alternating elevations and depressions, or hills and valleys, so to speak, extending transversely of the strip but disappearing by the time they reach the side edges of the strip. This is the normal condition of the rubber and fabric, for when in this condition the rubber is under no strain or tension, and the article in its entirety is, therefore, practically a flat strip or sheet. It is made this way, and can be readily shipped in this condition, and it does not require flexing or distortion in order to make it assume this condition.

In order that the reliner may assume the shape necessary for use in a pneumatic tire, the depressions on the inner surface of the strip are pressed outward, thus reversing their curvature, and this will, in effect, lengthen the longitudinal middle portion of the strip, and being of greater length than the side edges of the strip (the circumference of the tread is, of course, greater than the circumference of the base of the tire), this middle portion will at once form the tread portion and endeavor to assume the circumferential curvature of the tire. At the same time, the edges 3 are drawn inward by the lengthening of the middle portion, causing these edges to come close together in the manner shown in Fig. 2, so that the article in its entirety finally assumes an annular and tubular form. In this condition, portions of the rubber are, of course, under strain or a tension or stress, some of the rubber being under compression by reversal of the normal curvature, and some being in a stretched condition. The reliner, however, has a tendency, while in this condition, to return to its normal condition, for the sheet materials have been flexed from their normal shape or curvature, and cured rubber, of course, has a springy or resilient quality which causes it to endeavor to return to its normal or undistorted condition. At the same time, however, the contraction of the two side edges 3 toward each other is sufficient to form curved sides for the reliner which effectually resists the tendency of the tread portions to resume their normal conditions, so that the reliner is self-retained in its distorted condition—that is to say, in the shape or form, or approximately so, which it must assume when in use. This, of course, will cause the reliner to be resilient and springy in use, as some of the rubber is in a distorted or tensioned condition. In addition, the freshly made reliners can be stretched out practically flat for packing or shipment, without the necessity of flexing or distorting them from their manufactured shape, so that they can be stored or shipped while in their original or normal condition.

It is obvious, of course, that pneumatic tires, or pneumatic tire casings, such as that shown in Fig. 5, can be constructed in the same manner. In Fig. 5, the pneumatic tire casing has a tread portion B constructed exactly the same as the tread portion of the reliner shown in Fig. 1, except that in this case, the tread portion is thicker than the sides of the strip, and the edge portions of the strip have clencher-rim base portions b for use in conjunction with the well-known clencher-wheel-rims. But this tire casing when straightened out and flattened into its normal or original condition has practically the same appearance as the reliner shown in Fig. 1, and is under no strain or tension when thus reduced to a practically flat or spread-out condition.

As it is obvious that there are various other rubber-tire-articles which may have this same construction, I do not limit myself to reliners or tire casings.

From the foregoing, it will be seen that this application is a division of my copending application Serial No. 815,174, filed January 29, 1914, in which I have claimed the process and apparatus for making rubber-tire-articles.

What I claim as my invention is:—

1. A rubber tire article comprising a strip of rubber and fabric of a length suitable for the particular use to be made thereof, said strip having straight edges at the sides thereof, and having a transversely corrugated tread portion extending along the strip between said edges, the depressions on the outer surface of the strip forming the elevations on the inner surface thereof, whereby said strip is convertible into a tire or some element thereof by outward displacement of the elevations on said inner surface, said corrugations being capable of retaining themselves in said displaced condition.

2. A rubber tire article comprising a strip of rubber and fabric of a length suitable for the particular use to be made thereof, said strip having straight edges at the sides thereof, and having a transversely corrugated tread portion extending along the strip between said edges, the depressions on the outer surface of the strip forming the elevations on the inner surface thereof, whereby said strip is convertible into a tire or some element thereof by outward displacement of the elevations on said inner surface, said corrugations being capable of retaining themselves in said displaced condition, and said corrugations being of maximum height at the center of the strip and gradually becoming less toward the sides.

3. A rubber tire article comprising a strip of rubber and fabric of a length suitable for the particular use to be made thereof, said strip having straight edges at the sides thereof, and having a transversely corrugated tread portion extending along the strip between said edges, the depressions on the outer surface of the strip forming the elevations on the inner surface thereof, whereby said strip is convertible into a tire or some element thereof by outward displacement of the elevations on said inner surface, said corrugations being capable of retaining themselves in said displaced condition, said strip comprising superimposed layers of rubber and fabric, with sections of the rubber held under tension by said outward displacement of certain of the corrugations.

Signed by me at Chicago, Illinois, this 5th day of April 1916.

JOHN L. G. DYKES.